(12) United States Patent
Allen

(10) Patent No.: US 9,900,152 B2
(45) Date of Patent: *Feb. 20, 2018

(54) DISTRIBUTED PUBLIC KEY REVOCATION

(71) Applicant: Amazon Technologies, Inc., Seattle, WA (US)

(72) Inventor: Nicholas Alexander Allen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,209

(22) Filed: Feb. 8, 2016

(65) Prior Publication Data

US 2016/0191241 A1    Jun. 30, 2016

Related U.S. Application Data

(63) Continuation of application No. 14/133,052, filed on Dec. 18, 2013, now Pat. No. 9,258,120.

(51) Int. Cl.
*H04L 9/00* (2006.01)
*H04L 9/08* (2006.01)

(52) U.S. Cl.
CPC .......... *H04L 9/0891* (2013.01); *H04L 9/0894* (2013.01)

(58) Field of Classification Search
CPC ............. G06F 21/10; G06F 2221/0759; H04L 9/0825; H04L 9/0822; H04L 63/061
See application file for complete search history.

(56) References Cited

U.S. PATENT DOCUMENTS

| | | | |
|---|---|---|---|
| 6,823,068 B1 * | 11/2004 | Samid .................. | H04L 9/0838 380/277 |
| 2008/0089248 A1 | 4/2008 | Ushiyama et al. | |
| 2011/0173455 A1 * | 7/2011 | Spalka ................ | G06F 21/6254 713/189 |

* cited by examiner

*Primary Examiner* — Ghazal Shehni
(74) *Attorney, Agent, or Firm* — Davis Wright Tremaine LLP

(57) ABSTRACT

Techniques for improving the security and availability of cryptographic key systems are described herein. A graph representation of a network of cryptographic key servers is created with vertices representing the servers and edges representing connections between pairs of servers. As cryptographic key events are received, the graph is used to locate the appropriate servers upon which to perform the operations associated with the events. In the event that the network requires repairing, the graph is first repaired obeying any constraints on the graph and then the network is updated to reflect alterations to the graph.

20 Claims, 13 Drawing Sheets

DISTRIBUTED PUBLIC KEY REVOCATION

CROSS REFERENCE TO RELATED APPLICATIONS

This application is a continuation of U.S. patent application Ser. No. 14/133,052, filed Dec. 18, 2013 which is incorporated by reference herein.

BACKGROUND

Modern computer systems require robust and reliable cryptographic systems to maintain system security in a variety of contexts, such as data storage and data communication. In many modern computer systems, particularly those running in distributed and/or virtualized computing environments, computer system processes may issue a number of cryptographic keys, may subscribe to a number of other cryptographic keys and may use these cryptographic keys to maintain system security and/or integrity. In such systems, effective and secure cryptographic key management presents numerous challenges, particularly in systems that use public cryptographic key systems. The value of a public cryptographic key may increase by making the cryptographic key broadly available, but broadly distributing cryptographic keys may make it difficult to manage and/or to later revoke those cryptographic keys. Additionally, many cryptographic key systems have a single trusted authority for managing the revocation of a public cryptographic key. Single trusted authorities may lead to system slowdowns and even system shutdowns if the trusted authority becomes overwhelmed by requests to revoke public keys or to check if a key has been revoked. Single trusted authorities may also lead to system shutdowns if the authority host becomes unavailable due to communications problems, maintenance issues and/or other such system concerns. This is because the processes that rely on the availability of cryptographic keys are frequently system critical processes that cannot be suspended and if these processes are significantly delayed, the entire system can be impacted.

BRIEF DESCRIPTION OF THE DRAWINGS

Various embodiments in accordance with the present disclosure will be described with reference to the drawings, in which.

DETAILED DESCRIPTION

Figure 1:
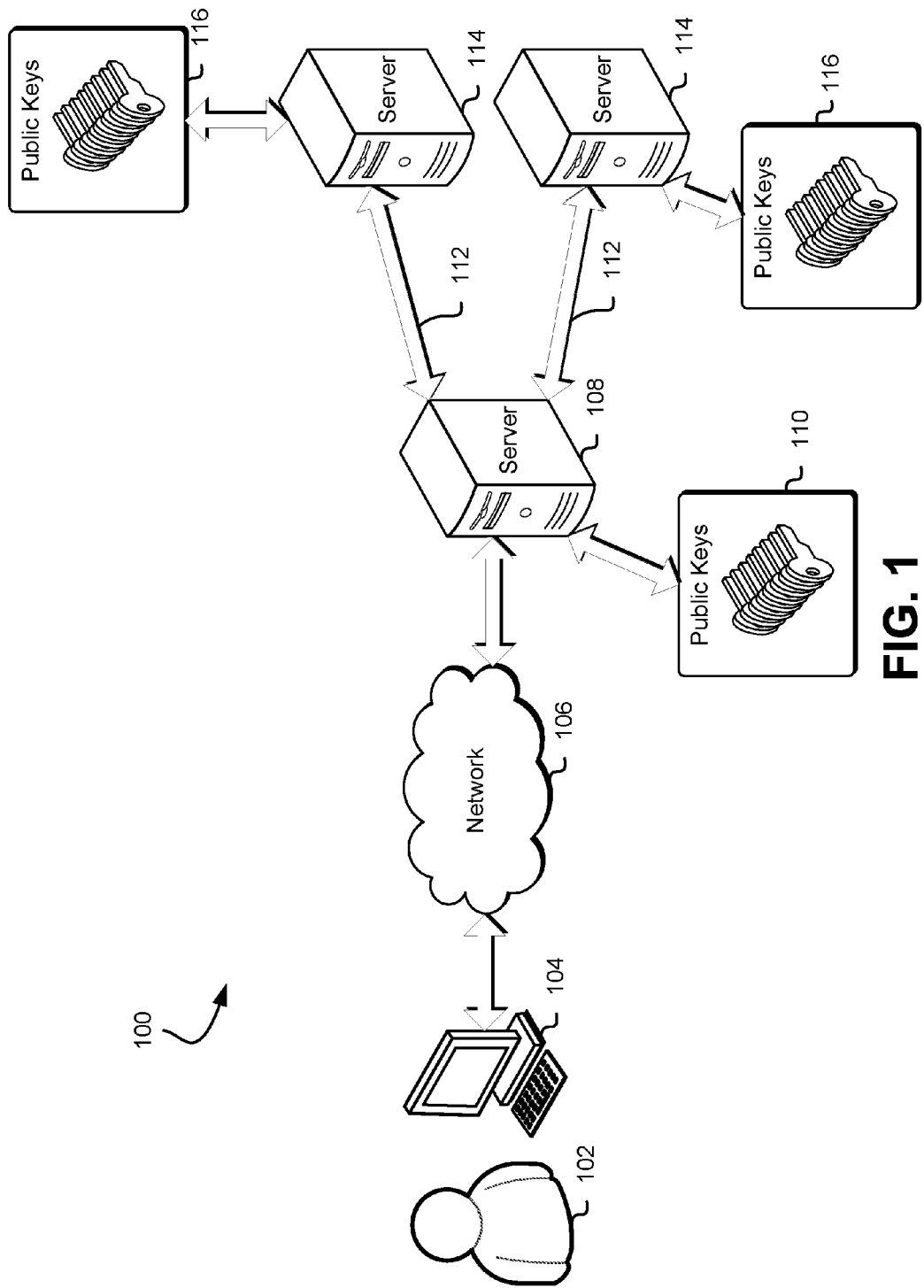
FIG. 1 illustrates an example environment in which cryptographic keys may be stored on distributed networks of cryptographic key servers in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for managing cryptographic resources on systems and the executable code operating thereon. In particular, techniques are disclosed for utilizing processor capabilities to distribute, manage and revoke cryptographic resources for operational elements of computer systems, including, but not limited to, servers, host machines, hypervisors, operating systems, guest virtual machines, applications, services and processes, while a plurality of those operational elements may be operating on one or more computer systems in a distributed and/or virtualized computer system environment. A computer system, in various embodiments, benefits from efficient management of cryptographic resources, such as public keys, key certificates, signing keys and/or other such cryptographic elements as well the systems, software, servers, services and/or other such computer system entities which may be used to manage the cryptographic key elements. A distributed and/or virtualized computer system may rely on the assumption that cryptographic elements and entities and may be tuned for performance based at least in part on the assumption that such cryptographic resources may be made available when subscribing processes request them. Without effective management of such cryptographic resources, processes, systems and/or applications may halt while waiting for unavailable resources, leading to potential application and/or system failure.

Consider, for example, a simple computer system where users may log in and access a network such as the internet. Such a system may rely extensively on one or more cryptographic keys to provide even these basic services. For instance, a user may log in to a system with a username and a password, but that username and password may be sent over an unsecure network for verification. To prevent unauthorized access, the username and password may be encrypted before being sent over the unsecure network. However, if the verification system cannot locate and/or validate the cryptographic key, the user cannot log in. Similarly, a user may access a network such as the Internet and may access a variety of services on the network using secure servers. Again, if the servers are unable to validate cryptographic credentials to, for example, visit a certain web page, the user may be prevented from accessing that webpage until the credentials can be validated. There are many other ways that modern computing systems use cryptographic keys and/or other cryptographic resources in the course of their operations and, as may be contemplated, these examples of how systems rely on cryptographic resources are merely illustrative examples and as such, other types of cryptographic subsystems may be considered as within the scope of the present disclosure.

Management of cryptographic keys includes such operations as key creation, key subscription, key revocation, key suspension, key storage, key exchange and/or other such key management operations. A cryptographic key is one or one or more pieces of data and/or sets of parameters that may, along with other inputs such as a message to be encrypted and/or electronically signed, determine the output of a cryptographic algorithm. In an encryption algorithm, unencrypted text or data may be transformed into encrypted text or data using one or more encryption keys. In the corresponding decryption algorithm, the encrypted text or data may be transformed back into the original unencrypted text or data using one or more decryption keys. In public key (or asymmetric key) encryption systems, cryptographic keys typically exist in pairs, with a public key and a private key. The public key is published and made available to key subscribers, while the private key is kept secure. The public key is used to encrypt the text or data so that any key subscriber may perform encryption. The public key is used with the private key to decrypt the encrypted data so that only the holder of the private key may unencrypt the encrypted text or data.

Public keys may be issued by key publishers and public keys may also be revoked and/or suspended. When a public key is revoked, it may become permanently unavailable for use to public key subscribers. A public key may be revoked because the key owner is no longer part of the system, or because the key owner is no longer trusted, or because the key was only temporary, or because the corresponding private key was compromised, or because of a security breach of a system that possibly enabled unauthorized access to the private key or for a variety of other such reasons. Public keys may be suspended (temporarily revoked) for similar reasons. For example a system may detect that a certain cryptographic key is being used in an unusual, suspect and/or potentially dangerous manner. The system may suspend the public key while further investigations are made to determine if the cryptographic key has become compromised. If the investigations reveal that the public and/or the corresponding private key is still secure, it can be restored but if the investigations reveal that the cryptographic key has become compromised, the public key can be permanently revoked. Key revocation is an important component of cryptographic key management systems because it is undesirable to maintain suspect and/or compromised cryptographic keys in the system. Security and reliability of key revocation systems are also important components of cryptographic key management systems because false revocations of keys may lead to system slowdowns and/or shutdowns.

Revocation of cryptographic keys may be managed by a variety of techniques including, but not limited to, revocation lists, webs of trust, privilege of revocation, denial of service, point of failure certificates and/or other such techniques. A revocation list (or certificate revocation list) for example, is a list of identifiers for cryptographic key certificates that have been revoked and thus, are no longer useable or trustworthy. In public key cryptography systems, a certificate is a link between a public key and an identity of the owner of that key. A web of trust is similar to a revocation list in that it may help a key subscriber determine whether a public key has been revoked and who owns the key, but rather than maintaining certificates and lists of certificates, the trust model is maintained in a decentralized model. A user, through their cryptographic key, may be a member of a plurality of webs of trust. As may be contemplated, these examples of revocation management techniques are merely illustrative examples and other methods of revocation management techniques may be considered as within the scope of the present disclosure.

Techniques disclosed herein include employing one or more decentralized cryptographic key servers to implement and manage cryptographic keys in public key cryptography systems. A cryptographic key server (also referred to herein as a revocation server) may be configured to respond to respond to a number of cryptographic key events such as the cryptographic key events described herein. A cryptographic key server may also be configured as a key subscription server that may be configured to respond to key subscription events from computer system services that may be connected to the network of cryptographic key servers. In some embodiments, a cryptographic key server may be configured as a revocation server, as a key subscription server or a combination of these and/or other such cryptographic key server roles.

First, a cryptographic key server or revocation server, which may be one of a plurality of such servers, may receive a public key from a key publisher. A cryptographic key server or revocation server is a server that may be one of a plurality of servers configured to at least maintain lists of public keys as well as one or more pieces of metadata about the keys such as owners, publisher, subscriber lists, expiration dates, key type, whether the key has been suspended or revoked and/or other such key metadata and may also be configured to manage revocation of cryptographic keys. A revocation server may receive a public key from a key publisher and may store a record for that key. The revocation server may be a designated revocation server that may be chosen by the publisher and/or some other computer system service or entity to receive the public key. In some embodiments, one of the revocation servers may be designated an entry point, or first revocation server. The first revocation server may be arbitrarily chosen from the plurality of decentralized revocation servers. The first revocation server may also be chosen based on the basis of a pre-established trust relationship between the first revocation server and the publisher and/or the system. The first revocation server may also be chosen based on a variety of other system factors including, but not limited to, system load, network and/or other communications latency, proximity, the nature of the key owner, the nature of one or more key subscribers and/or other such system factors. In some embodiments, the key publisher may be the key owner. In some embodiments, the key publisher may be acting on the behalf of a key owner such as, for example, a key publisher service running on a computer system that key owners may connect to and/or subscribe to.

A public key, as described above, is the publically available part of the public key (or asymmetric key) cryptographic system that provides publically available encryption and, combined with a private key, the corresponding decryption. Public and private key pairs may also be used for, for example, digital signing of electronic messages where one party signs a message with a private key and the signature may be verified with the public key. Examples of public keys used in public key cryptography systems include, but are not limited to, OpenPGP public keys (an open standard based on the pretty good privacy (PGP) standard), public keys from X.509 certificates, public keys in one of the public-key cryptography standards (PKCS) defined standard formats or other such public keys. As described above, the public key may be stored with metadata describing information about the format, purpose, ownership and/or other such aspects of the key. The process of publishing the public key may include other processes, including, but not limited to, authentication of the key owner or publisher, for example by including a signed statement by a public authority or web of trust. Published keys may also include additional information including, but not limited to, a list of key policy guidelines for key maintenance. This authentication and/or authorization information may be included with the key and stored as metadata.

With a plurality of decentralized revocation servers, one or more methods of managing and maintaining connections between the servers may be utilized. In some embodiments, the decentralized network of revocation servers may be represented by a directed graph. A directed graph may represent a distributed network of revocation servers by representing each individual server as a node or vertex in the graph and representing a communication link between pairs of revocation servers (pairs of nodes) as a directed edge in the graph. A communication link, which may be a two-way link between pairs of revocation servers, may be represented as a directed edge (a one-way graph link) that indicates the existence of the communication link and not the direction of the communication link. Directed graphs may be useful to represent and/or model ordered sequences of connections, such networks of servers. For example, a network of three servers, all of which are connected to each other, may be represented as a directed graph with three nodes (denoted "A", "B" and "C") and three directed edges (from "A" to "B", from "A" to "C" and from "B" to "C"). In this example, one or more directed paths exist between any pair of servers. Further details about representing networks of servers as directed graphs is described herein at least in connection with FIGS. 3 and 4. As may be contemplated, the term graph is used for illustration and includes within its meaning mathematically equivalent representations and structures that contain mathematically equivalent representations of graphs. Example representations include, but are not limited to, trees, forests of trees, matrices, systems of equations and/or the like.

At a time after receiving the published key and/or the associated metadata, the first revocation server may receive a subscription request from a subscriber seeking to be notified about revocation events for that cryptographic key. The first revocation server may traverse a directed graph of revocation servers to locate at least one available key insertion points. An available key insertion point may exist at a revocation server on the basis of a capacity or system resources limiting the number of keys the revocation server may manage. The first revocation server may distribute the published key to least one available key insertion point. In some embodiments, the first revocation server may provide one of the available key insertion points. The first revocation server may also choose the available key insertion points if more available points exist than are required by the system. The first revocation server may also select available key insertion points on the basis of geographical or geopolitical redundancy, or on minimizing costs for communication channels, or on minimizing level crossings in the directed acyclic graph, or based on other such factors.

In some embodiments, the directed graph may be a directed acyclic graph (DAG). A DAG is a directed graph with the added property that there is no directed path from any vertex back to itself. In some embodiments the directed graph may be a k-connected directed acyclic graph. A k-connected directed acyclic graph (also referred to as a k-vertex connected acyclic graph or a k-connected graph) is a DAG with more than "k" vertices with the property that any set of fewer that "k" vertices may be removed from the graph while still maintaining a directed path from any one remaining vertex in the graph to any other remaining vertex of the graph. For example, a 3-connected DAG is a DAG with at least four vertices with the property that, any set of up to 2 vertices may be removed from the graph and the graph will still have a directed path from any of the remaining vertices to any other of the remaining vertices. The connectivity of a graph (the value for "k") is often used as a measure of the redundancy and/or robustness of a network represented by a graph. A k-connected graph may be constructed by, for example, adding each vertex to the graph by connecting it to at least "k" other existing vertices. For example, a new vertex may be added to a 3-connected DAG (with at least 4 vertices) by adding connections from at least 3 of the existing vertices to the new one. In an embodiment where the directed graph is a k-connected DAG, the first revocation server may traverse the graph until it has identified at least k revocation servers each with an available key insertion point and may insert the keys at those available key insertion points. The first revocation server may validate that each added connection is redundant by checking that each of the at least k revocation servers do not already possess the key.

After the key insertion points are selected by the first revocation server, the subscriber may instantiate a connection to a key insertion point on a new revocation server by establishing a communication channel with each of the respective key insertion points. The subscriber may register its intent to propagate cryptographic key events associated with the key by exchanging messages using the established communication channels. For example, the revocation servers may provide web service interfaces and the communication channels may be, for example, hypertext transfer protocol (HTTP) connections. The revocation servers may also include other sorts of network servers and the communications channels may include other types of communications protocols. In defining communications between one cryptographic key server and another cryptographic key server, the source cryptographic key server may be the cryptographic key server that establishes the connection and the target cryptographic key server may be the cryptographic key server that receives the connection. In some embodiments, communication between two cryptographic key servers may be two-way communication. In such embodiments, both servers may serve as both source and target. When a cryptographic key server and/or a communications link to that server fails, the failed server may be referred to herein as the target cryptographic server because of the failure of other servers in the network to establish connections to that that failed server.

A cryptographic key server may receive a variety of cryptographic key events associated with a key. Some of the cryptographic key events may cause alteration or mutation of the connectivity of the directed acyclic graph representation of the network or may violate one or more constraints of the graph including, but not limited to the k-connectedness of the graph. Network mutating cryptographic key events may include cryptographic key events which mutate or alter the network such as cryptographic key server failure events, cryptographic key insertion events which exceed the capacity of a cryptographic key server, cryptographic key subscription events which violate the directed acyclic graph being k-connected and/or other such cryptographic key events which may cause the need for the graph to repaired by adding new vertices representing new servers to the graph, adding new edges representing new connections between servers to the graph, replicating keys between servers and/or other such graph repair techniques. Network non-mutating cryptographic key events may include cryptographic key events which do not mutate or alter the network such as cryptographic key insertion events which do not exceed server capacity, cryptographic key subscription events, cryptographic key revocation events which do not violate the directed acyclic graph being k-connected and/or other such cryptographic key events.

When the graph representation of the network has been repaired, the network may also be repaired according to the new graph representation by adding and/or removing servers, adding and/or removing connections, inserting, deleting and/or replicating keys to different servers and/or other such repair operations. In some embodiments, repairs may be performed directly on the servers. In some embodiments, repairs may be performed by transmitting instructions to servers in the network, causing them to perform the repairs. The servers in the network may be a subset of a plurality of servers provided by a computing resource service provider, or may be a subset of a plurality of servers located outside of a computing resource service provider such as, for example, servers located within a customer premises network or may be a combination of computing resource service provider and/or customer premises servers.

At some point after connecting the subscribers to the key insertion points, the first revocation server may receive a graph event indicating a permanent failure for one or more of the subscribers. The first revocation server may determine that a permanent failure may have occurred on the basis of being unable to reestablish the communication channel with the subscriber. The first revocation server may determine that a temporary and/or possibly permanent failure may have occurred as a result of a loss of communication on the communication channel. The first revocation server may attempt to address the failure and may traverse the directed graph of revocation servers to locate a new available key insertion point to replace the lost connection. The first revocation server may repair the graph by establishing a communication channel with the new available key insertion point. The first revocation server may select the new available key insertion point on the basis of the insertion point being downstream of the subscriber. The first revocation server may also select the new available key insertion point on the basis of the insertion point being a new or relatively underutilized revocation server.

Also at some point after connecting the subscribers to the key insertion points, the first revocation server may receive one or more revocation events for the cryptographic key. The first revocation server may seek to confirm the revocation event by at least querying one or more services to validate the revocation event for the key in order to mitigate the possibility of false revocation events. The first revocation server may confirm the revocation event by consulting one or more revocation servers closely and/or directly connected with the key owner. The first revocation server may also traverse up the directed graph of revocation servers until reaching one or more revocation servers that are closely and/or directly connected to the service that issued the key revocation event. The first revocation server may consult the one or more closely and/or directly connected revocation servers to determine whether more than a threshold number of directly connected revocation servers received and/or agrees with the revocation. The criteria of a plurality or threshold number may be specified by the key metadata, or by the system or by some other such method. The first revocation server may confirm the revocation event by validating a signature for the event notice. The first revocation server may validate that the signing key is one of a plurality of approved signing keys specified by the key metadata. For example, the public key may act as its own signing key for revocation. In some embodiments, the key metadata may specify additional signing keys in order to support revocation of a public key for which the private key has been lost. As may be contemplated, these methods of verifying a key revocation event are merely illustrative examples and other methods of verifying a key revocation event may be considered as within the scope of the present disclosure.

An example of how key metadata may be used in association with keys, key events and signing keys is an embodiment with a cryptographic key "key 1" with metadata that may contain a second cryptographic key "key 2." A cryptographic key server may then have an authenticated way to link key 2 to key 1. A revocation message for key 1 may arrive at the entry point server signed by key 1, in an embodiment described herein where a key may serve as its own signing key for key revocation events. However, if the signing portion of key 1 has been lost, then it may not be possible to use key 1 as its own signing key for key revocation events. In such a situation, key 2 may be used as a signing key for the revocation of key 1 and, because key 2 is in the metadata of key 1 and the revocation server can link key 2 to key 1, thereby allowing key 2 as a signing key for the key revocation event.

Upon receiving and/or verifying a key revocation event, the first revocation server may revoke the key and/or may also propagate the key revocation event to other revocation servers using the established communication channels so that the other revocation servers may also revoke the key. In some embodiments, the first revocation server may send metadata with the propagated key revocation event to indicate to the other revocation servers that the revocation has been verified. The metadata may be used to verify any event that adds or removes keys to the network, increasing key reliability and security. In some embodiments, the other revocation servers may also verify the revocation event for themselves. In some embodiments the revocation servers may revoke the key by expunging records associated with the public key. In such embodiments, computer system entities querying a revocation server may receive a non-authoritative determination of key revocation on the basis of the revocation server not holding a copy of the public key. A non-authoritative determination of key revocation occurs when, upon receiving a request from a subscriber or service as to whether a public key has been revoked, a revocation server may only respond that the public key does not exist. A non-authoritative determination of key revocation does not distinguish between cryptographic keys that were created and then revoked (and destroyed) and cryptographic keys that were never created.

In some embodiments the first and other revocation servers may instead revoke the key by constructing a tombstone record of the key. The tombstone record may maintain a record of the deleted key and include metadata regarding the revocation of the key including, but not limited to, a timestamp, reason, and identity for the revoking party. In such embodiments, computer system entities querying a revocation server may receive an authoritative determination of key revocation on the basis of the revocation server holding the tombstone record. An authoritative determination of key revocation occurs when, upon receiving a request from a subscriber or service as to whether a key has been revoked, the revocation server may respond that the key has or has not been revoked and may also respond with data about the revocation event. An authoritative determination of key revocation distinguishes between keys that were created and then revoked and keys that were never created.

In some embodiments the first revocation server may make a temporary revocation that may serve to, for example, suspend a key. For example, a key owner may wish to temporarily revoke a public key while investigating whether the key has been compromised. The revocation server may permit the key owner to later republish the key to restore its use. The determination of whether the revocation is temporary or permanent may be based on the revocation event. In some embodiments, the revocation servers may use tombstone records to implement temporary revocations. When a key is temporarily revoked, the presence of the tombstone record will allow a revocation server to provide an authoritative determination of key revocations for the temporarily revoked key and may, in some embodiments, include an indication that the revocation is temporary. If a temporarily revoked key is later restored, a key revocation server may use data stored in the tombstone to restore the revoked key, so that a new key does not need to be created. Temporarily revoked keys may be made permanent if it is discovered, for example, that the key has been compromised.

FIG. 1 illustrates an example environment 100 where computer systems may store and process events for cryptographic keys on one or more distributed cryptographic key servers, as well as the associated code running thereon, in accordance with at least one embodiment. A computer system user, process, service and/or some other computer system entity 102 may connect to a computer system using a computer system client device 104. In some embodiments, the computer system entity 102 may be a person, or may be a process running on one or more remote computer systems, or may be some other computer system entity, user or process. The command or commands to connect to the computer system may originate from an outside computer system and/or server, or may originate from an entity, user or process on a remote network location, or may originate from an entity, user or process within the computer system, or may originate from a user of the computer system client device 104, or may originate as a result of a combination of these and/or other such entities.

The computer system entity may connect to one or more cryptographic key servers 108 (referred to herein simply as "servers", "key servers", "cryptographic key servers", "revocation servers" and/or other such terms) via one or more networks 106 and/or entities associated therewith, such as servers connected to the network, either directly or indirectly. The computer system client device 104 that may request access to the host computer system may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

In some embodiments, the one or more cryptographic key servers 108 may one or more cryptographic key servers that may be configured to at least receive communications from remove computer system entities. In some embodiments, the server 108 may be configured to connect to other cryptographic key servers 114 within a network and to send and/or receive communications to and from the other connected cryptographic key servers 114. In some embodiments, one server such as server 108 may be designated a first server or an entry point server and may be designated as a single point of entry for communications to any of the servers within the server network. In such embodiments, a communication sent to the entry point server 108 may be forwarded to one or more of the other servers 114 in the network.

In some embodiments, the one or more cryptographic key servers 114 in the network may be configured to store one or more public keys 116 such as the public cryptographic keys used in conjunction with corresponding private cryptographic keys in public key cryptography systems. The cryptographic key servers 114 may also be configured to store other such public and/or private cryptographic information including, for example, identity certificates, revocation lists, webs of trust and/or other such cryptographic information. The cryptographic key servers may also be configured to store metadata about the stored cryptographic keys and/or other public and/or private cryptographic information such as the owner of the key and/or other cryptographic information, the date and time it was created, the permissions associated with it, and other such metadata. In some embodiments, the first or entry point server 108 may be configured to store one or more public keys 110, other cryptographic information and/or the metadata associated with such cryptographic information.

In some embodiments, a cryptographic key server 108 may be configured to receive events relating to cryptographic keys including, but not limited to, events related to inserting keys into the one or more cryptographic key servers, events related to adding, editing and/or deleting metadata regarding the keys stored on the one or more cryptographic key servers, events related to adding, editing and/or deleting other cryptographic information, events related to deleting keys, metadata and/or other cryptographic information, events related to temporarily and/or permanently revoking keys, events related to adding and/or removing subscribers to keys and/or other cryptographic information and other such events. In some embodiments, the cryptographic key server 108 may also be configured to receive one or more events relating to the communications between servers in the network of cryptographic key servers such as, for example, the creation of new servers, the deletion of servers, the loss of communications between servers, the loss of communications between servers and subscribers and/or publishers of keys and/or other such events. The cryptographic key server may be configured to forward at least a portion of the events to other cryptographic key servers 114.

In some embodiments, the events may be associated with one or more instructions or operations that may be executed or performed by one or more of the cryptographic key servers in response to the events. For example, a first cryptographic key server 108 may receive an event that includes a request from a computer system entity 102 to insert a public key into the network of cryptographic key servers. The first cryptographic key server may, for example, process the event and determine that for the sake of redundancy, the public key should be inserted into three different cryptographic key servers. As a result of this determination, the first cryptographic key server may insert the public key into the set of public keys 110 and may also forward a request to the cryptographic key servers 114 to insert the public key into the sets of public keys 116. In some embodiments, the first cryptographic key server 108 may forward the event to the cryptographic key servers 114. In some embodiments, the cryptographic key server 108 may forward a communications request based at least in part on the event to the cryptographic key servers 114.

Figure 2:
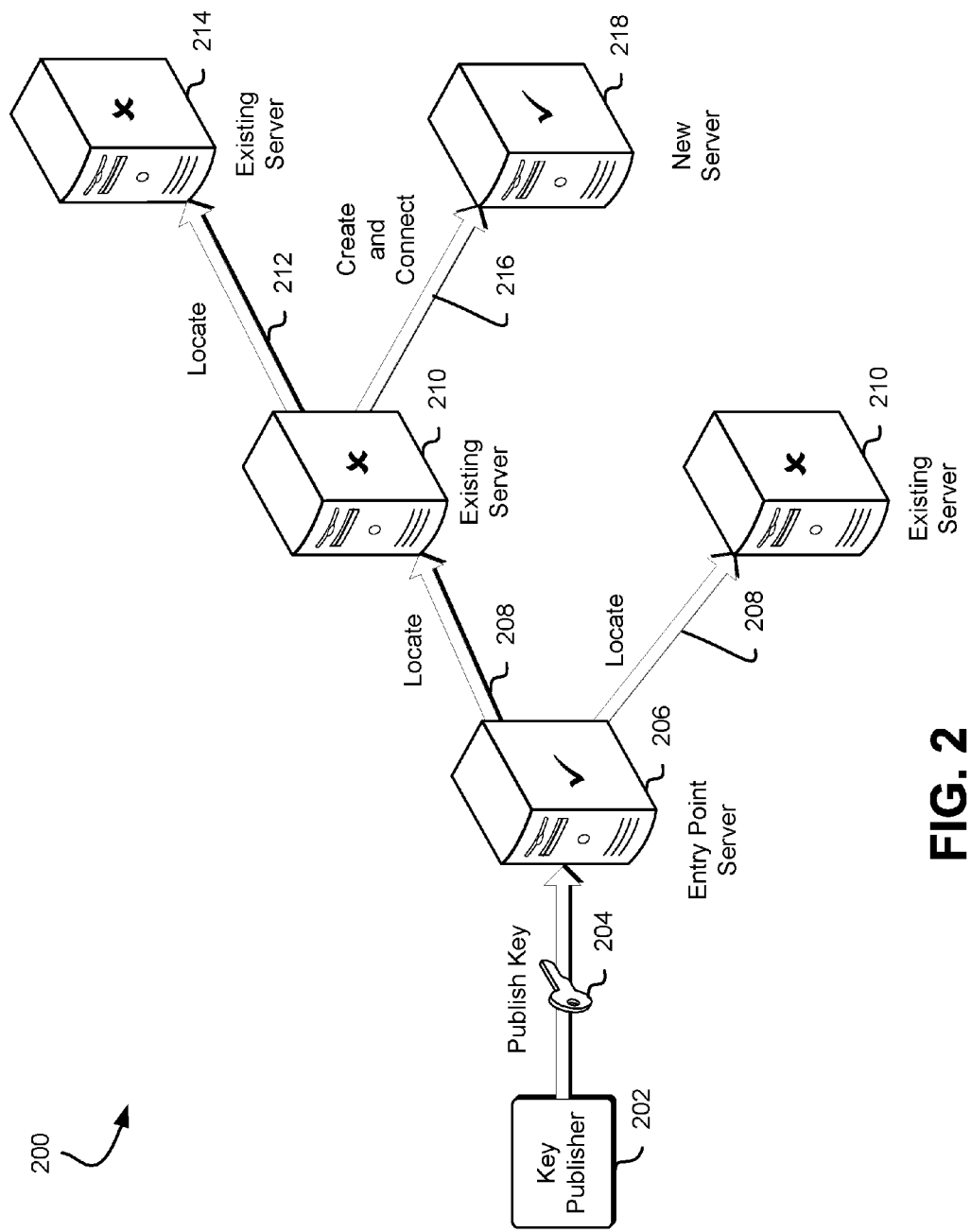
FIG. 2 illustrates an example environment in which a cryptographic keys may be published to a network of cryptographic key servers in accordance with at least one embodiment.

FIG. 2 illustrates an example environment 200 where a cryptographic key and/or other such cryptographic information may be published to a network of cryptographic key server as described herein at least in connection with FIG. 1 and in accordance with at least one embodiment. A key publisher 202 may publish a key 204 to an entry point server 206. The key publisher may be a computer system user, process, service and/or other such computer system entity. The request to publish a key 204 may be issued as an event such as the events described herein at least in connection with FIG. 1 and in accordance with at least one embodiment. The entry point server 206 may be a server such as a cryptographic key server, or a revocation server, or a server connected to other cryptographic servers or some other such server.

Upon receiving the event to publish a key 204, the entry point server 206 may determine that the published key should be stored on some number of servers so that the published key may be redundantly stored. In some embodiments, the entry point server may first locate 208 all of the existing servers 210 that are directly connected to the entry point server 206. In some embodiments, the key referred to in the event to publish a key 204 may be stored on one or more of the existing servers 210 according to whether each of the existing servers 210 has any space available (i.e. any available key insertion points) to store the new key. If the existing servers 210 do not have any available key insertions points, then the existing servers may attempt to locate 212 and further connected existing servers 214 to store the key. In the event that the entry point server is not able to locate enough available key insertion points to store enough copies of the key to satisfy key redundancy requirements, the first entry point server 206 may store one of the key copies itself or, in some embodiments, may attempt to create and connect 216 to one more new servers 218 and may store copies of the key on available key insertion points on these new servers.

Figure 3:
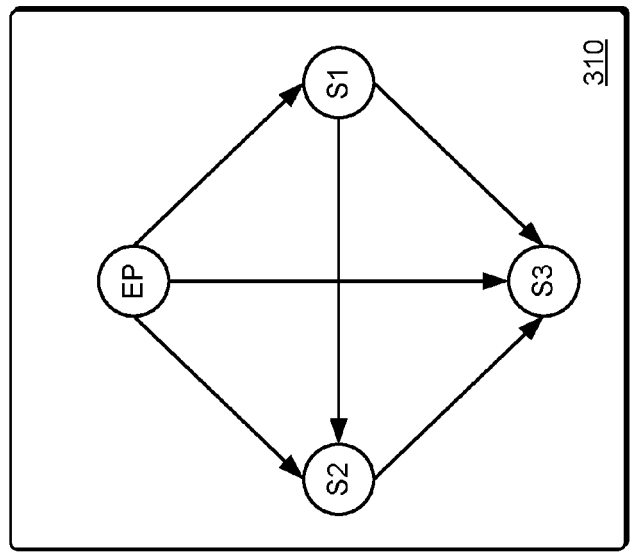
FIG. 3 illustrates an example environment in which a network of cryptographic key servers may be represented by a constrained directed acyclic graph in accordance with at least one embodiment.
Figure 3:
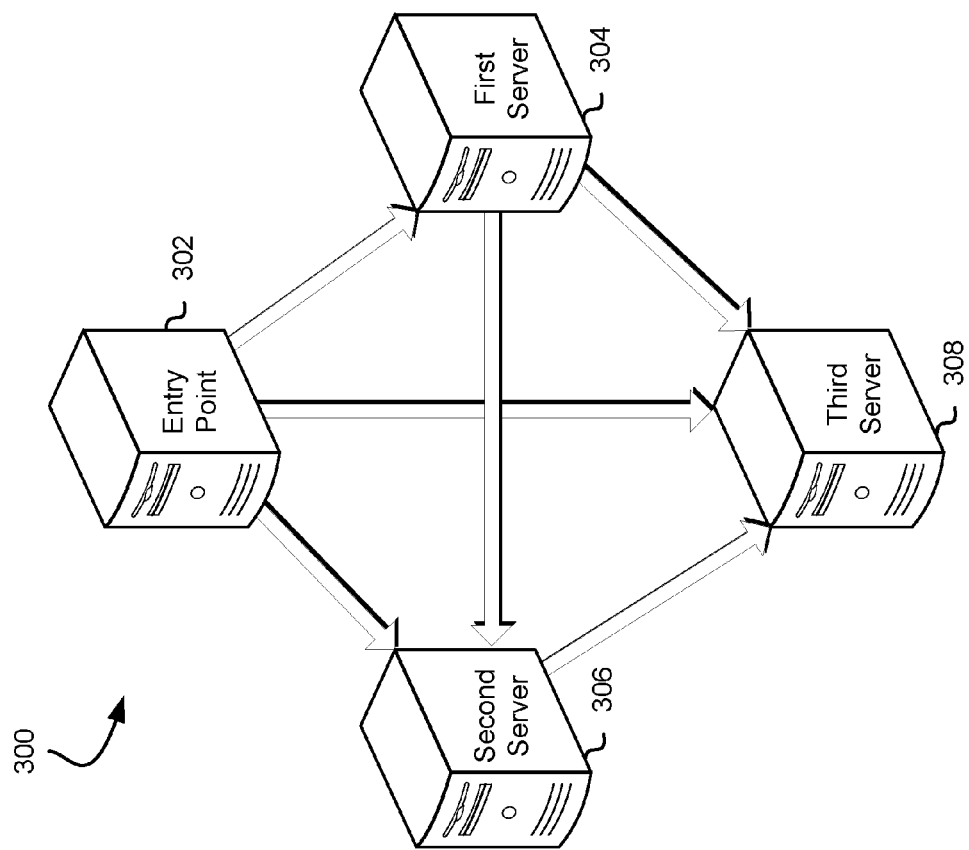

FIG. 3 illustrates an example environment 300 where a network of cryptographic key servers as described herein at least in connection with FIG. 1 may be arranged and/or connected in accordance with one or more constraints on connectivity and may also be represented by a directed acyclic graph representation of the network in accordance with at least one embodiment. In FIG. 3, an entry point server 302 may be connected to a first server 304, a second server 306 and a third server 308. The first server 304 may also be connected to the second server 306 and the third server 308. The second server 306 may also be connected to the third server 308. The graph 310 represents a directed acyclic graph representation of the server network arrangement where node or vertex "EP" represents the entry point server 302, node or vertex "S1" represents first server 304, node or vertex "S2" represents second server 306 and node or vertex "S3" represents third server 308.

In such a connection arrangement as is illustrated in FIG. 3, the servers are said to be k-connected where k is three. A three-connected network arrangement of servers means that if any two (k minus one) of the servers and their associated connections were removed from the network, the remaining servers would still be connected. A k-connected network arrangement of servers must have at least "k plus one" servers, so the minimum number of servers for a 3-connected network arrangement of servers is four (three plus one). A k-connected arrangement of servers may provide a degree of redundancy in a network arrangement where, in addition to constraining the network such that any changes to the network retain the k-connectedness, the system also stores k redundant copies of information (i.e. cryptographic keys) on the network. If, for example, the three-connected network arrangement represented in FIG. 3 were a three-connected network arrangement of cryptographic key servers and there were three copies of a cryptographic key stored on the servers, than up to two of the servers could be lost and the cryptographic key would still be stored on at least one server and would still be accessible to all servers on the network through the remaining connections.

Figure 4:
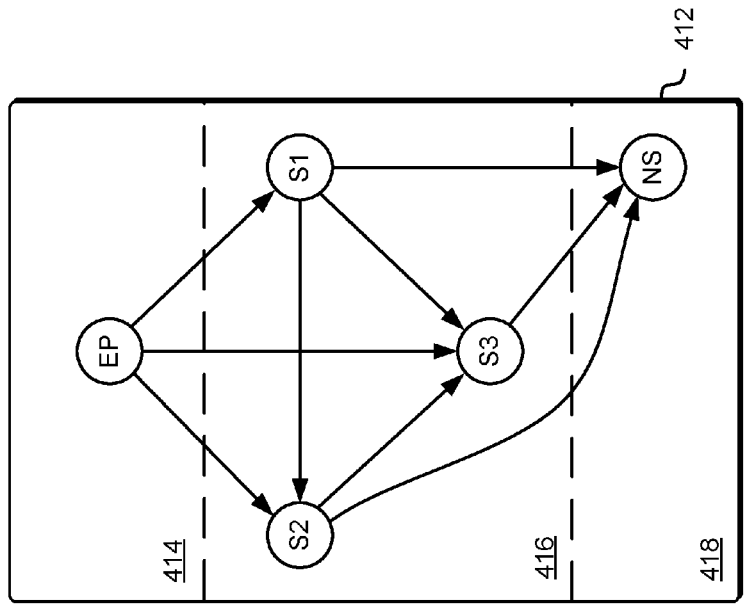
FIG. 4 illustrates an example environment in which an additional server may be added to a network of servers represented by a constrained directed acyclic graph while maintaining constraints in accordance with at least one embodiment.
Figure 4:
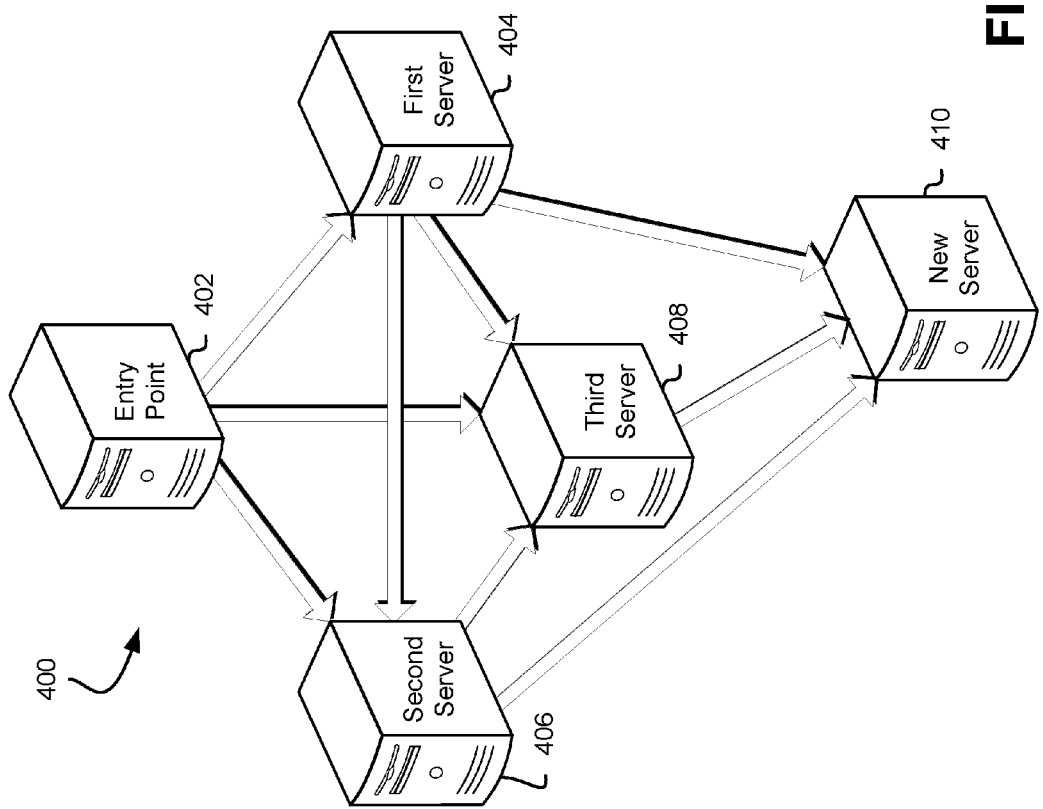

FIG. 4 illustrates an example environment 400 where an additional server may be added to a 3-connected network arrangement of servers and connected so that the 3-connectedness of the servers may be maintained as described herein at least in connection with FIG. 3 and in accordance with at least one embodiment. In FIG. 4, an entry point server 402 may be connected to a first server 404, a second server 406 and a third server 408. The first server 404 may also be connected to the second server 406 and the third server 408. The second server 406 may also be connected to the third server 408. The graph 412 represents a directed acyclic graph representation of the server network arrangement where node or vertex "EP" represents the entry point server 402, node or vertex "S1" represents first server 404, node or vertex "S2" represents second server 406 and node or vertex "S3" represents third server 408.

A new server 410 may be added to the network of servers and may be connected to three other servers so that the 3-connectedness of the network of servers may be maintained. A new server 410 may be connected to first server 404, second server 406 and third server 408. In some embodiments, it may be desirable to directly connect a new server 410 to the entry point server 402 so as to maintain a shorter connection route between the entry point server 402 and the new server 410. In some embodiments, it may not be desirable to directly connect a new server 410 to the entry point server 402 so that the entry point server 402 does not become overwhelmed with connections. In the graph 412, the node "NS" represents the new server.

The graph 412 illustrates an additional constraint that may be placed on a directed acyclic graph representation of a network of cryptographic key servers. The graph 412 contains three regions or levels 414, 416 and 418 where nodes may be placed on the graph. The levels of the graph allow the graph to be partitioned such that, when a new node is added to the graph, the new node may be added to an appropriate level and connected to nodes in the same or nearby levels. A multi-level partitioning method for a graph may serve to keep the graph balanced and easily traversable. For example, in the graph 412, the entry point server represented by node "EP" is on a separate level. This keeps the entry point server from having too many connections since only those servers represented by nodes on level 416 may connect to the entry point server. Further levels may be constrained so that no more than a certain number of nodes may be added to that level. For a 3-connected graph, limiting the number of nodes on any one level to three may keep the graph balanced. Nodes "S1", "S2" and "S3" occupy level 416 and so the new node "NS" that represents the new server 410 may be placed on a new level 418.

Figure 5:
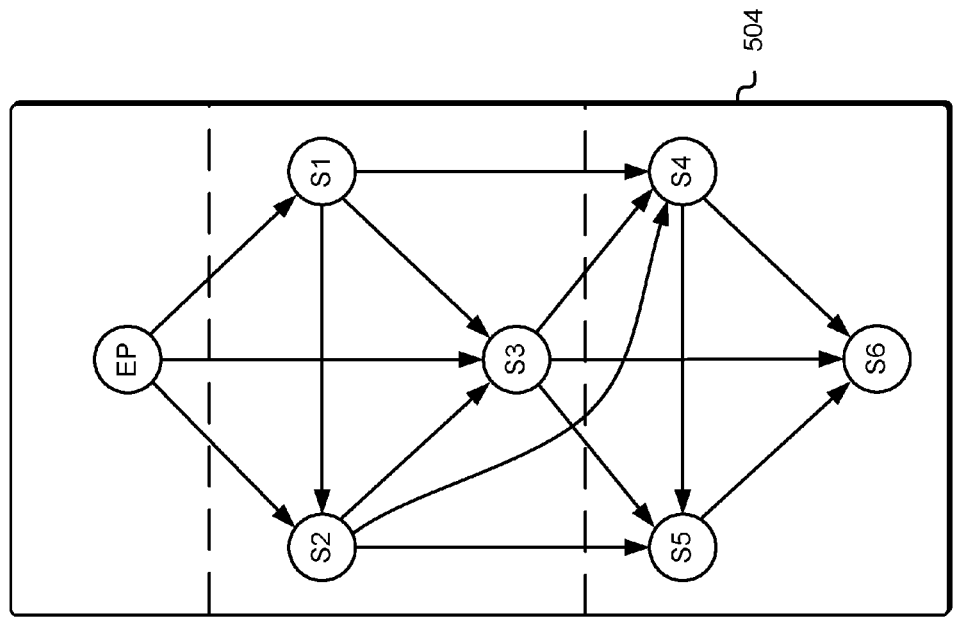
FIG. 5 illustrates an example environment in which more additional servers may be added to a network of servers represented by a constrained directed acyclic graph while maintaining constraints in accordance with at least one embodiment.
Figure 5:
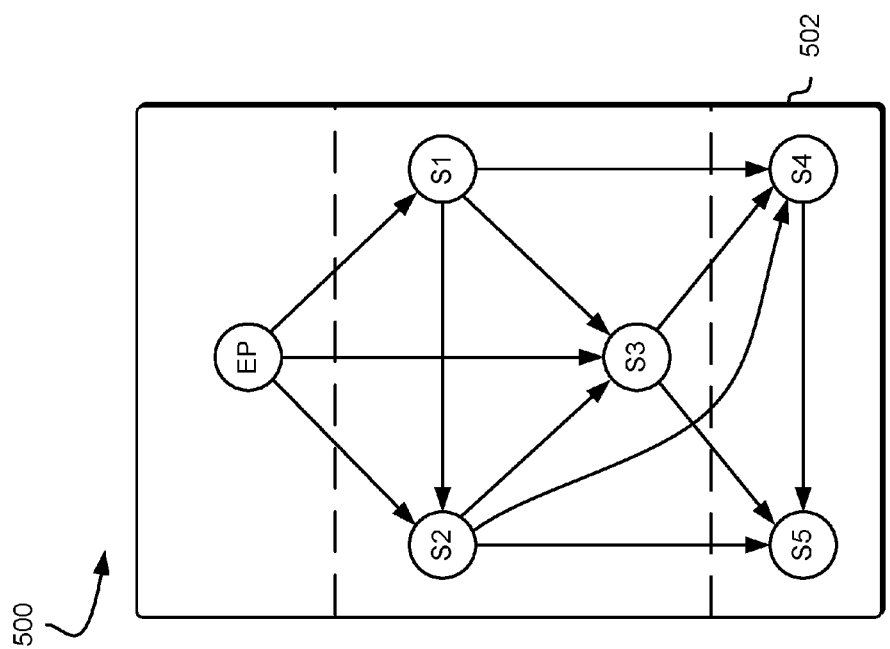

FIG. 5 illustrates an example environment 500 where additional servers may continue to be added to a 3-connected network arrangement of servers and connected so that the 3-connectedness of the servers may be maintained as described herein at least in connection with FIG. 3 and in accordance with at least one embodiment. The graph 502 represents adding a sixth server represented by node "S5" and connecting that server to three other servers represented by node "S2", node "S3" and node "S4", thereby maintaining the 3-connectedness of the graph and thus of the network arrangement of servers. The inserted node "S5" may be connected to nodes on the same level as the inserted node ("S4") or to nodes on the level above ("S2" and "S3"), thereby maintaining the further constraint on balancing the graph as described herein at least in connection with FIG. 4 and in accordance with at least one embodiment. The graph 504 represents adding a seventh server represented by node "S6" and connecting it to two servers on the same level ("S4" and "S5") and one server on the level above ("S3"), also maintaining both the 3-connectedness constraint and the balancing constraint on the graph.

Figure 6:
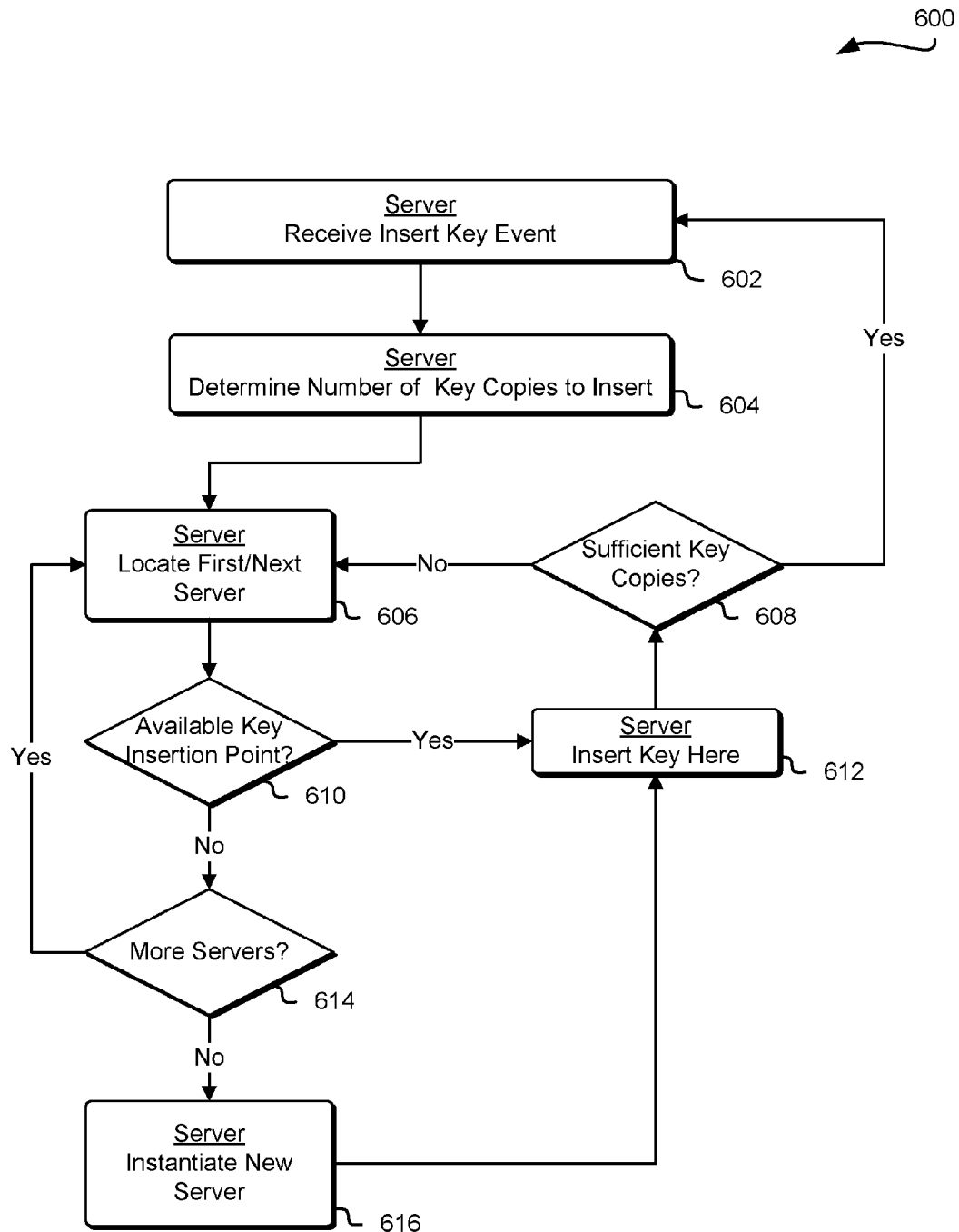
FIG. 6 illustrates an example process for inserting cryptographic keys into a network of cryptographic key servers in accordance with at least one embodiment.

FIG. 6 illustrates an example process 600 for inserting cryptographic keys into a network of cryptographic key servers as described herein at least in connection with FIG. 2 and in accordance with at least one embodiment. In some embodiments, a server such as entry point server 206, existing server 210, existing server 214 and/or new server 218 described herein in connection with FIG. 2 may perform at least a portion of the process 600 illustrated in FIG. 6. A server such as an entry point server may receive an event to insert a key 602 into the network of servers and may determine 604 the number of key copies to insert into available key insertion points on servers in the network of cryptographic key servers. In some embodiments the server such as an entry point server may determine 604 the number of key copies to insert into available key insertion points based on, for example, system policy, or on network connectivity, or on security needs, or on one or more requested levels of availability of the key, or on the nature of the owner of the key, or on the nature of subscribers to the key or on other such factors.

The server such as an entry point server may first locate a server to insert the key into 606 if the located server has an available key insertion point 610. If the located server has an available key insertion point 610, the entry point server may insert 612 the key in the available key insertion point in the located server. The entry point server may then determine if a sufficient number of key copies 608 have been inserted. If a sufficient number of key copies 608 have been inserted, the entry point server may then wait for the next key event. If a sufficient number of key copies 608 have not been inserted, the entry point server may then locate a next server to insert the key into 606. If the located server does not have an available key insertion point 610, the entry point server may then determine if there are more servers 614 where keys may be inserted by locating a next server to insert the key into 606. If there are no more servers 614 where keys may be inserted, the entry point server may, in some embodiments, instantiate a new server 616 with available key insertion points and insert 612 the key in the available key insertion point in the new server. The entry point server may continue inserting keys into available key insertion points and/or instantiating new servers to insert keys into until there are a sufficient number of key copies 608.

Figure 7:
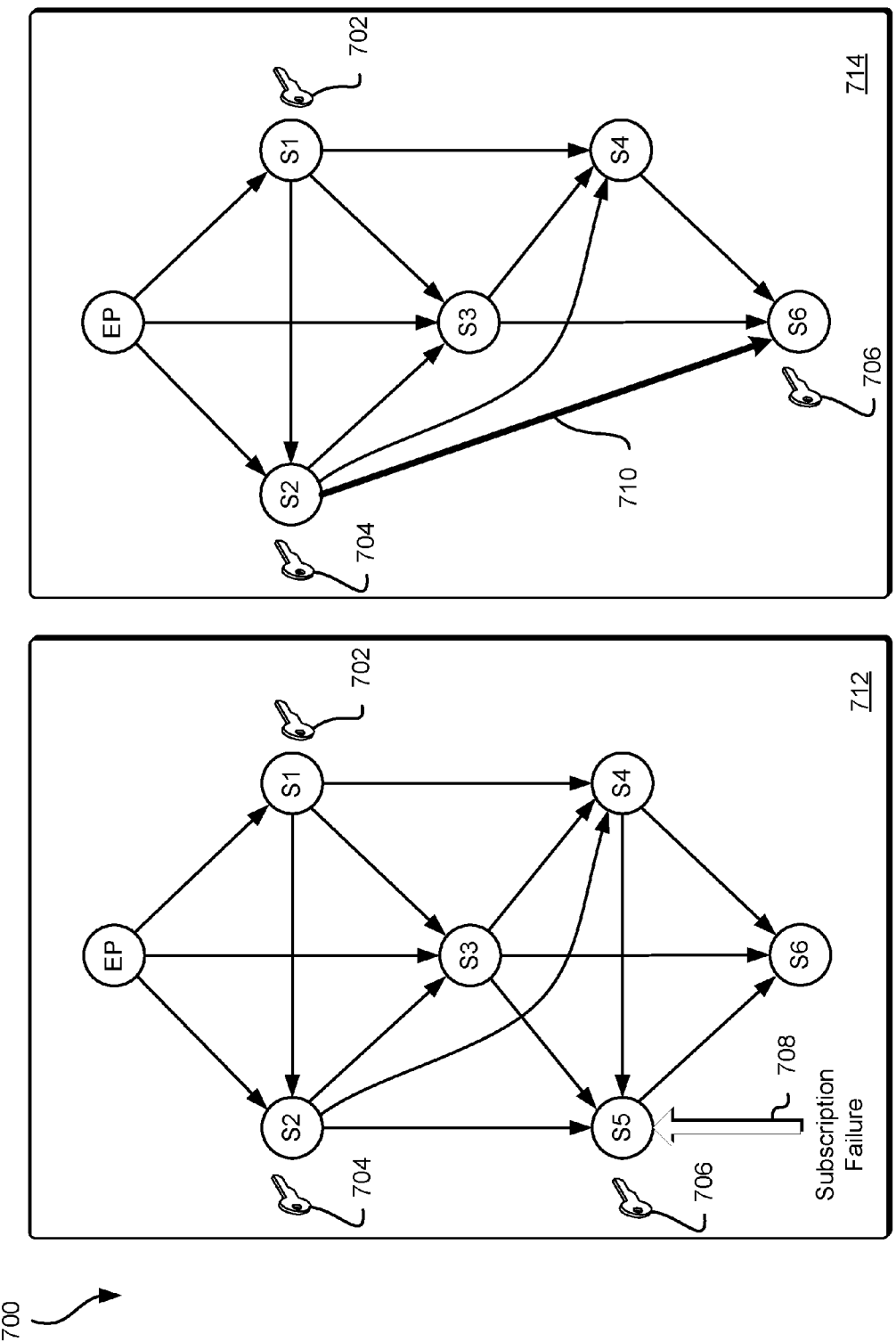
FIG. 7 illustrates an example environment in which a constrained directed acyclic graph representation of a network of servers may be altered by migrating cryptographic keys to existing servers in response to a subscription failure event for a cryptographic key in accordance with at least one embodiment.

FIG. 7 illustrates an example environment 700 where, in response to a subscription failure of a server containing a key and/or the key inserted into a network of cryptographic key servers as described herein at least in connection with FIG. 6, the directed acyclic graph representation of the network of cryptographic key servers may be altered and corresponding alterations to the network of cryptographic key servers may be made in accordance with at least one embodiment. A graph 712 representing a network of seven cryptographic key servers is created as described herein at least in connection with FIG. 5 and in accordance with at least one embodiment. The network of cryptographic key servers may contain three copies of a cryptographic key. Cryptographic key copy 702 may be stored on a server represented by node "S1" in the graph 712, cryptographic key copy 704 may be stored on a server represented by node "S2" in the graph 712 and cryptographic key copy 706 may be stored on a server represented by node "S5" in the graph 712.

In response to a subscription failure 708 where one or more keys such as cryptographic key 706 stored on a server represented by node "S5" may be no longer available to the subscriber, the one or more unavailable cryptographic keys may be first migrated to one or more existing servers such as the server represented by node "S6" in the graph 714. In some embodiments, when the server represented by node "S5" in the graph 712 may be determined to be unavailable, additional connections 710 between the server represented by node "S2" in the graph 714 and the server represented by node "S6" in the graph 714 may be made so as to maintain the 3-connectedness of the graph as described herein at least in connection with FIG. 3 and in accordance with at least one embodiment.

Figure 8:
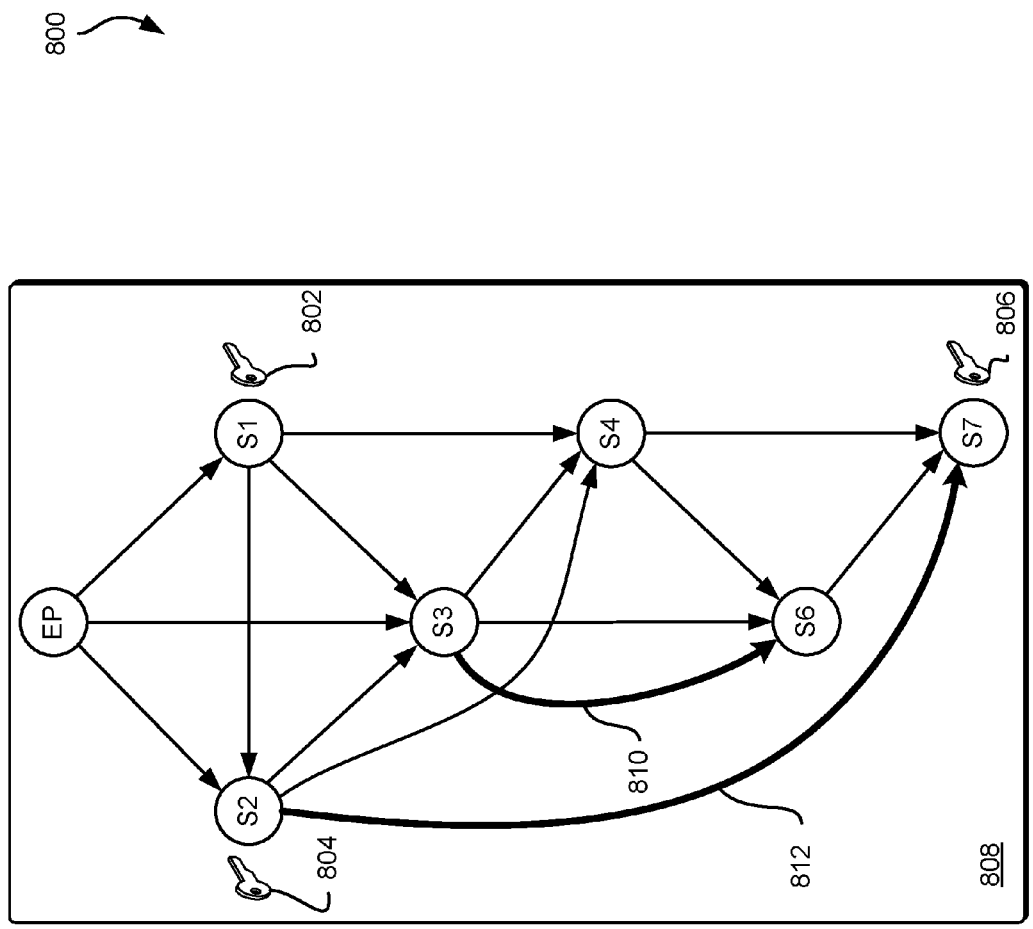
FIG. 8 illustrates an example environment in which in which a constrained directed acyclic graph representation of a network of servers may be altered by migrating cryptographic keys to new servers in response to a subscription failure event for a cryptographic key in accordance with at least one embodiment.

FIG. 8 illustrates an example environment 800 where, in response to a subscription failure of a server containing a public key and/or a subscription failure for one or more keys associated with those servers as described herein at least in connection with FIG. 6, the directed acyclic graph representation of the network of cryptographic key servers may be altered and corresponding alterations to the network of cryptographic key servers may be made in accordance with at least one embodiment. Prior to a subscription failure such as subscription failure 708 as described herein in connection with FIG. 7, the network of cryptographic key servers may contain three copies of a cryptographic key. Cryptographic key copy 802 may be stored on a server represented by node "S1" in the graph 808, cryptographic key copy 804 may be stored on a server represented by node "S2" in the graph 808 and cryptographic key copy 806 may be stored on a server which may be no longer available to a subscriber such as the failed server represented by node "S5" in graph 712 described herein in connection with FIG. 7.

In order to address the unavailability of cryptographic key 806 by migrating the published key to an existing server as was described herein in connection with FIG. 7, the one or more unavailable cryptographic keys 806 may instead be migrated to one or more new servers such as the new server represented by node "S7" in the graph 808. In some embodiments, additional connections between servers may be made to maintain the 3-connectedness of the graph as described herein at least in connection with FIG. 3 and in accordance with at least one embodiment. For example, an additional connection between the server represented by node "S3" in the graph 808 and the server represented by node "S6" in the graph 808 may be made along with an additional connection 812 between the server represented by node "S2" in the graph 808 and the server represented by node "S7" in the graph 808.

Figure 9:
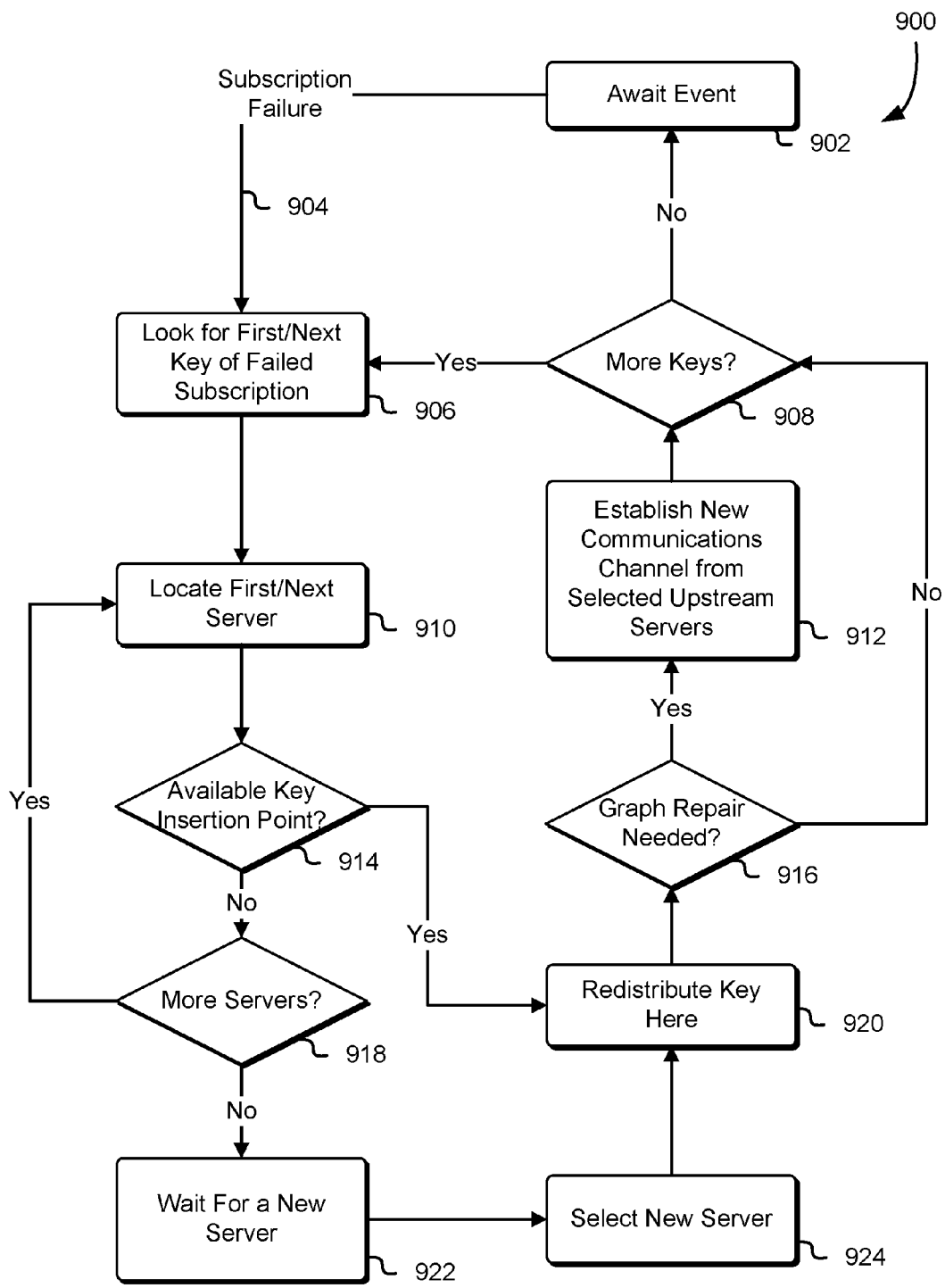
FIG. 9 illustrates an example process for updating a constrained directed acyclic graph representation of a network of servers may be altered in response to a subscription failure event in accordance with at least one embodiment.

FIG. 9 illustrates an example process 900 for responding to a subscription failure event for one or more cryptographic servers and/or a subscription failure for one or more keys associated with those servers as described herein at least in connection with FIG. 7 and in accordance with at least one embodiment. A server such as an entry point server 206 described in connection with FIG. 2 may perform the process 900 illustrated in FIG. 9. An entry point server may 902 await an event and, upon receiving a 904 subscription failure event may begin 906 looking for one or keys associated with the failed subscription. In some embodiments some or all of the keys may have failed because of a failure of the server that contains the key. In some embodiments, keys may fail for other reasons such as communications failure between servers, communications failures between subscribers and servers and/or other such reasons.

For each failed key, the entry point server may 910 locate a server and look for 914 an available key insertion point on the located server. If there is a server with a 914 available key insertion point, the entry point server may then 920 redistribute the failed key to the new key insertion point. If there is not 914 an available key insertion point, the entry point server may look at 918 other servers in the server network and in some embodiments, may 922 wait for a new server to become available with available key insertion points before 924 selecting that new server to 920 redistribute the failed key. A new server with available key insertion points may become available as a result of a new server being instantiated, or as a result of a new server joining the network, or as a result of freeing of key insertion points on existing servers or for a combination of these and/or other such reasons.

Upon 920 redistributing the failed key, the entry point server may then evaluate whether it is necessary to 916 repair the graph representation of the network so that the graph representation and/or the underlying network continue to conform to constraints on the graph such as for connectedness, balance and/or other such constraints. If it is necessary to 916 repair the graph, the entry point server may repair the graph by, for example, 912 establishing new communications channels from one or more selected upstream to the servers that do not satisfy the one or more constraints. The entry point server may then determine whether there are 908 more keys that need to be distributed and, if not may return to wait for the next event.

Figure 10:
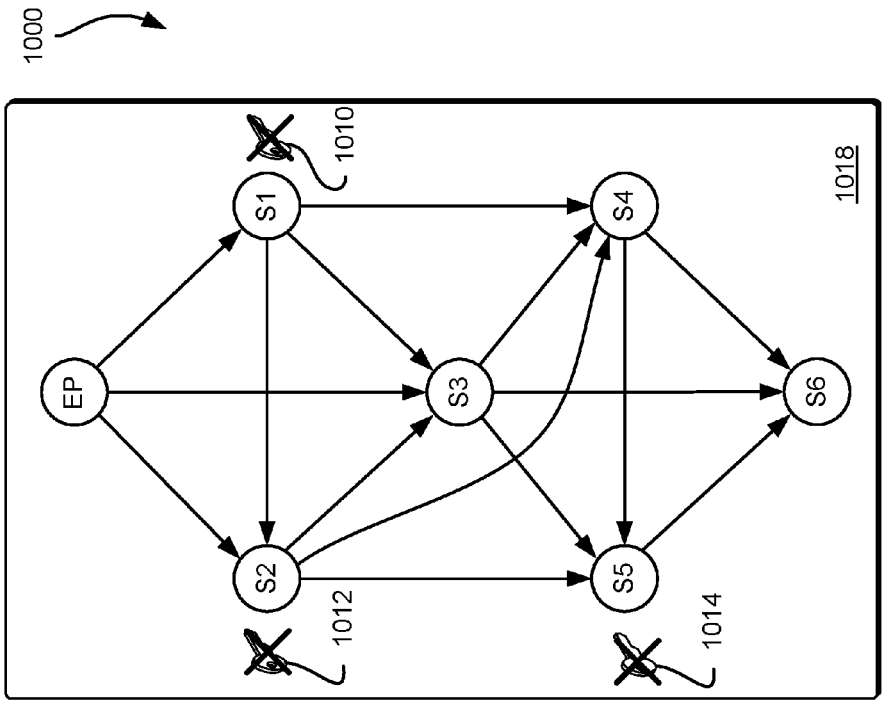
FIG. 10 illustrates an example environment in which cryptographic keys may be permanently deleted from cryptographic key servers in response to a cryptographic key revocation event in accordance with at least one embodiment.
Figure 10:
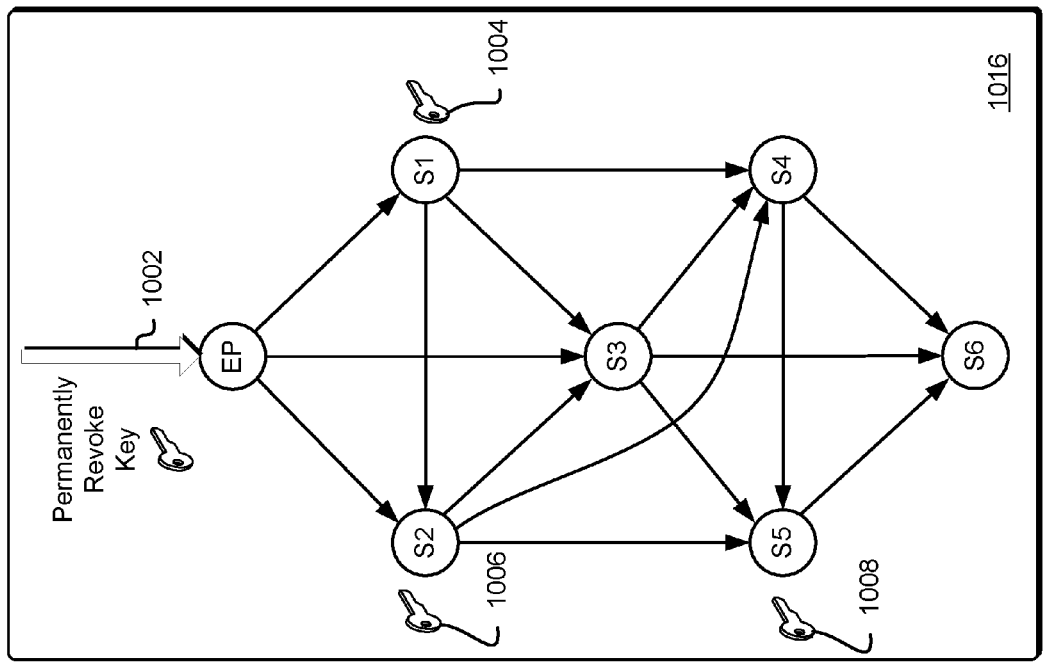

FIG. 10 illustrates an example environment 1000 where cryptographic keys stored on a network of cryptographic key servers may be deleted in response to a key revocation event as described herein at least in connection with FIG. 2 and in accordance with at least one embodiment. A graph 1016 representing a network of seven cryptographic key servers is created as described herein at least in connection with FIG. 5 and in accordance with at least one embodiment. The network of cryptographic key servers may contain three copies of a cryptographic key. Cryptographic key copy 1004 may be stored on a server represented by node "S1" in the graph 1016, cryptographic key copy 1006 may be stored on a server represented by node "S2" in the graph 1016 and cryptographic key copy 1008 may be stored on a server represented by node "S5" in the graph 1016. An entry point server represented by node "EP" in the graph 1016 may receive an event to 1002 permanently revoke the key stored as cryptographic key copy 1004, cryptographic key copy 1006 and cryptographic key copy 1008. Upon receiving the event, the entry point server may begin to traverse the graph 1018 and may 1010 delete the cryptographic key copy from the server represented by node "S1" in graph 1018, may 1012 delete the cryptographic key copy from the server represented by node "S2" in graph 1018 and may 1014 delete the cryptographic key copy from the server represented by node "S3" in graph 1018.

Figure 11:
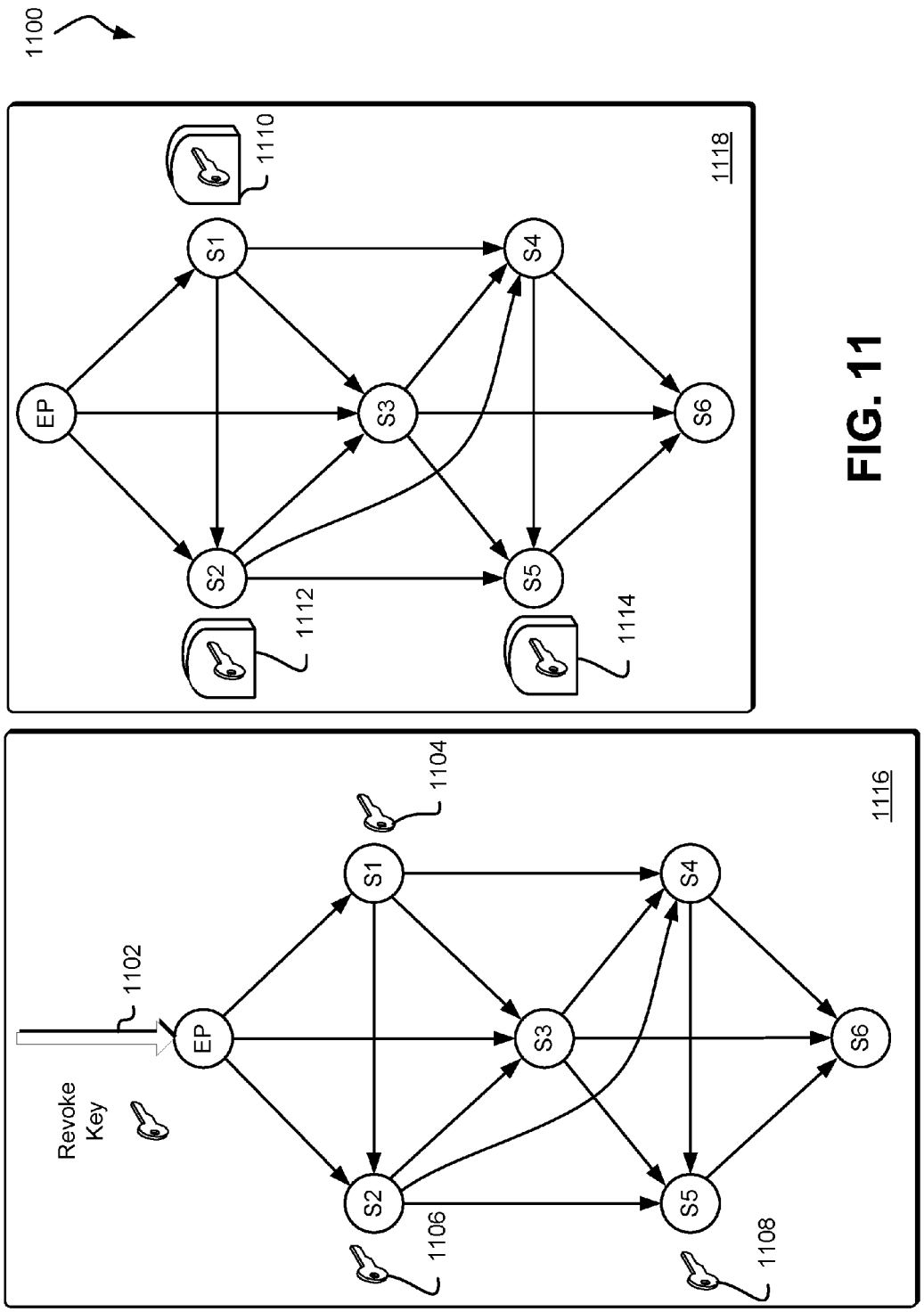
FIG. 11 illustrates an example environment in which cryptographic keys may be temporarily and/or permanently deleted from cryptographic key servers in response to a cryptographic key revocation event by altering metadata associated with the cryptographic keys in accordance with at least one embodiment.

FIG. 11 illustrates an example environment where, rather than deleting the cryptographic key copies from the graph in response to a key revocation event as was illustrated in connection with FIG. 10, an entry point server may create tombstone records of cryptographic keys in response to a key revocation event. As was mentioned previously herein, a tombstone record is a record of the deleted key which may include metadata regarding the revocation of the key. A tombstone record may be used to permanently and/or temporarily revoke a key.

A graph 1116 representing a network of seven cryptographic key servers is created as described herein at least in connection with FIG. 5 and in accordance with at least one embodiment. The network of cryptographic key servers may contain three copies of a cryptographic key. Cryptographic key copy 1104 may be stored on a server represented by node "S1" in the graph 1116, cryptographic key copy 1106 may be stored on a server represented by node "S2" in the graph 1116 and cryptographic key copy 1108 may be stored on a server represented by node "S5" in the graph 1116. An entry point server represented by node "EP" in the graph 1116 may receive an event to 1102 revoke the key stored as cryptographic key copy 1104, cryptographic key copy 1106 and cryptographic key copy 1108. Upon receiving the event, the entry point server may begin to traverse the graph 1118 and may 1110 create a tombstone record for the cryptographic key copy on the server represented by node "S1" in graph 1118, may 1112 create a tombstone record for the cryptographic key copy on the server represented by node "S2" in graph 1118 and may 1114 create a tombstone record for the cryptographic key copy on the server represented by node "S3" in graph 1118.

Figure 12:
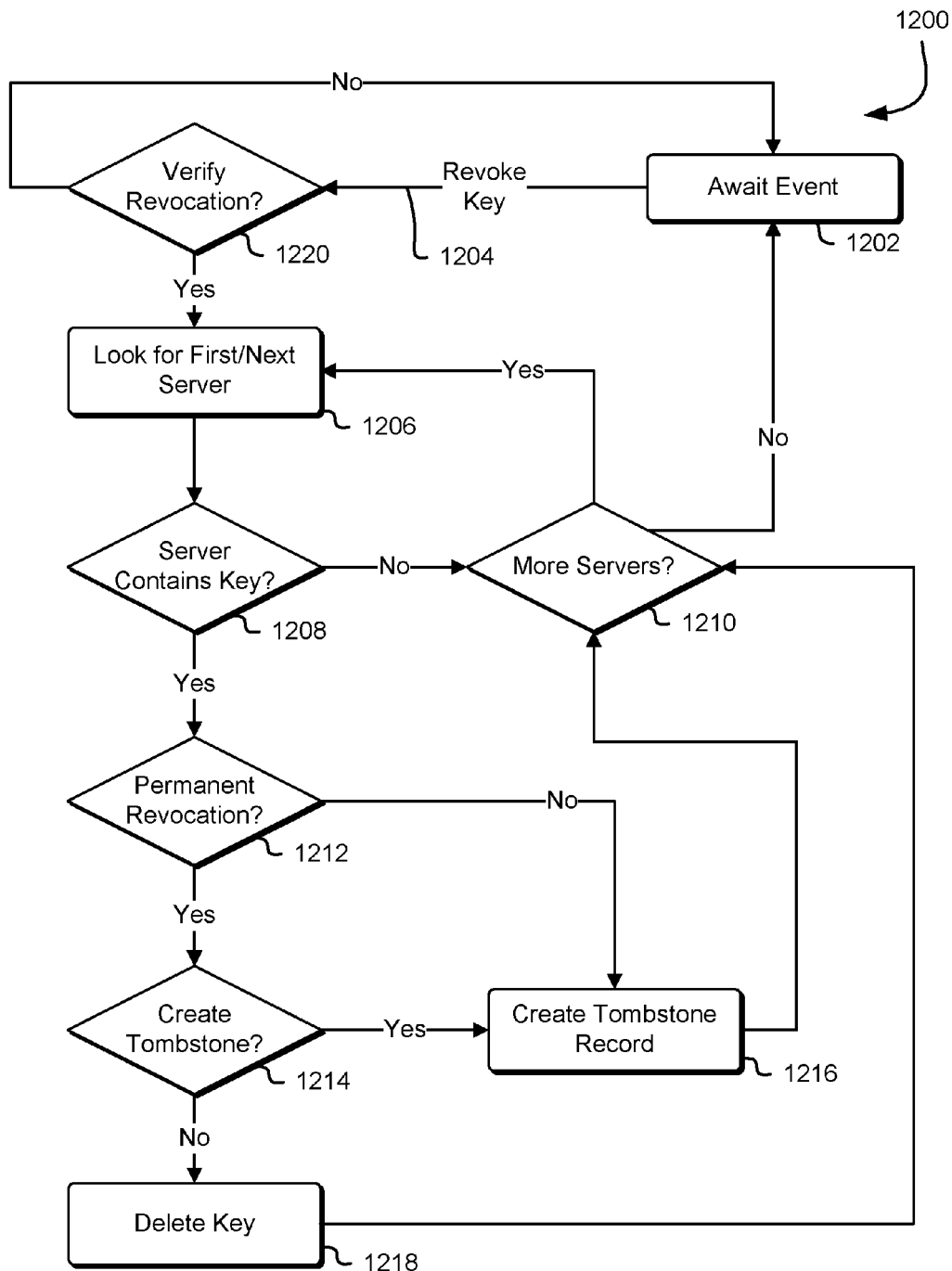
FIG. 12 illustrates an example process for temporarily and/or permanently deleting cryptographic keys from cryptographic key servers in response to a cryptographic key revocation event in accordance with at least one embodiment.

FIG. 12 illustrates an example process for temporarily or permanently revoking one or more cryptographic keys stored on a network of cryptographic key servers as described herein at least in connection with FIG. 2 and in accordance with at least one embodiment. A server such as an entry point server 206 described in connection with FIG. 2 may perform the process 1200 illustrated in FIG. 12. An entry point server may 1202 await an event and, upon receiving a 1204 revoke key event may first 1220 verify that the revocation event is valid before beginning the revocation by 1206 locating the first server that 1208 contains the key that is to be revoked. In some embodiments, the entry point server may seek to confirm the revocation event by at least querying one or more of other servers. If a server that 1208 contains the key is located, the first revocation server may in some embodiments determine if the revocation is a 1212 permanent revocation and, if so whether the permanent revocation includes 1214 the creation of a tombstone record for the key. In some embodiments, an entry point server may also perform 1214 the creation of a tombstone record for the key if the revocation of the key is not a 1212 permanent revocation. If an entry point server is not performing 1214 the creation of a tombstone record for the key, then the entry point server may 1218 delete the key. After the key revocation has been processed for one server, the entry point server may continue looking for 1210 more servers to process the revocation thereon before returning to wait for the next event.

Figure 13:
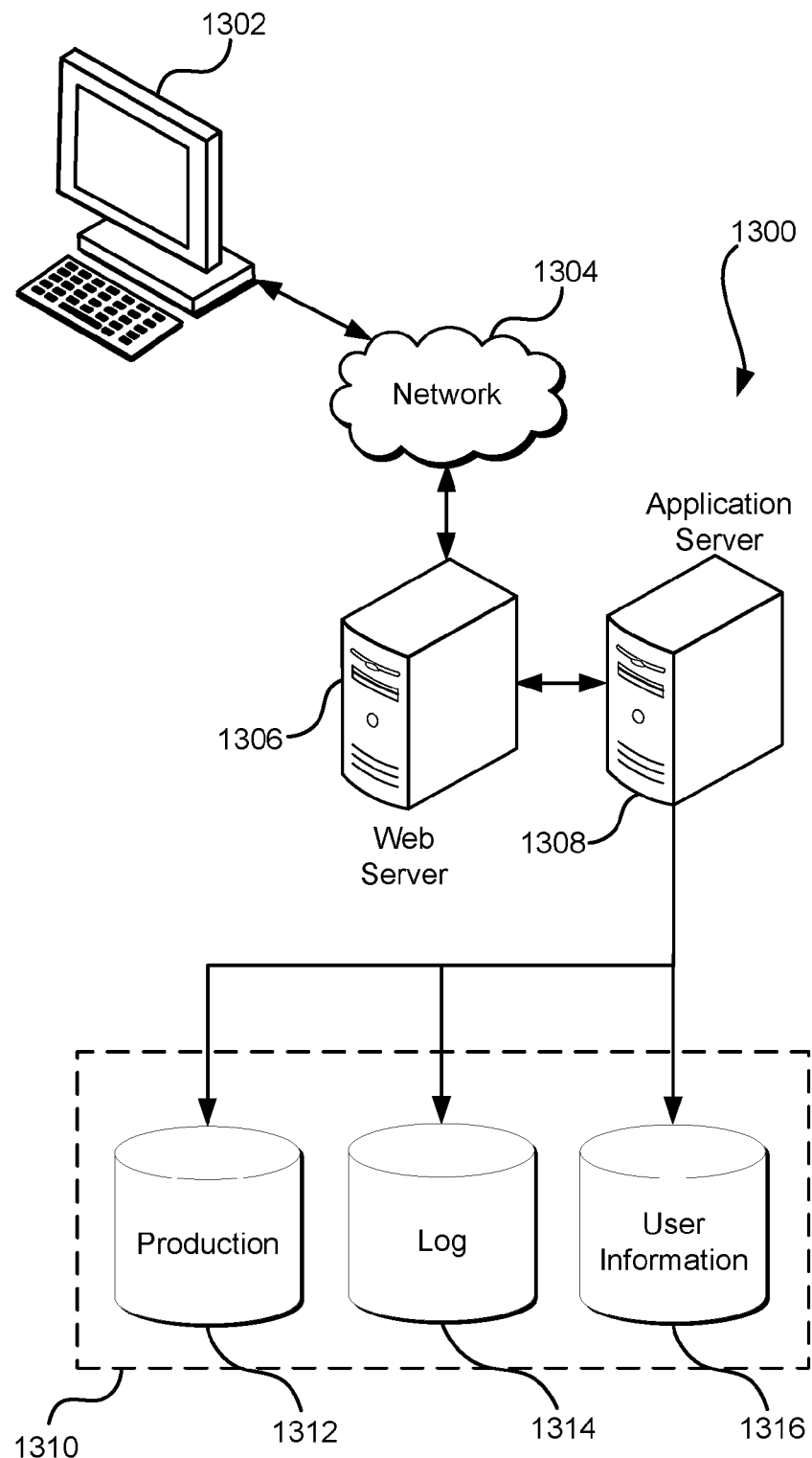
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:
1. A system, comprising:
  memory to store computer-executable instructions which, if executed by one or more processors, cause the system to:
    in response to a cryptographic key revocation event, at least:
      traverse a graph representation of a network of a plurality of cryptographic key servers to identify a cryptographic key server upon which to perform one or more operations associated with the cryptographic key revocation event;
locate the cryptographic key server based at least in part on the graph representation; and
perform the one or more operations associated with the cryptographic key revocation event on the cryptographic key server.

2. The system of claim 1, wherein the computer-executable instructions further include instruction which, if executed by the one or more processors, cause the system to:
in response to a cryptographic key insertion event, at least:
traverse the graph representation to identify a second cryptographic key server upon which to perform operations associated with the cryptographic key insertion event;
locate the second cryptographic key server based at least on the graph representation; and
perform the operations associated with the cryptographic key insertion event on the cryptographic key server.

3. The system of claim 1, wherein the one or more operations at least include an operation that deletes a cryptographic key from the cryptographic key server.

4. The system of claim 1, wherein the one or more operations at least include an operation to insert a tombstone record into the cryptographic key server, the tombstone record at least including a timestamp of a cryptographic key revocation event, a reason for the cryptographic key revocation event, and an identity of a revoking party.

5. The system of claim 4, wherein the tombstone record indicates that the cryptographic key revocation is temporary.

6. The system of claim 5, wherein the one or more operations at least include an operation to restore a cryptographic key after a temporary revocation using data stored in the tombstone record.

7. The system of claim 1, wherein the one or more operations at least include an operation that validates the cryptographic key event by using one or more pieces of metadata associated with a public cryptographic key associated with the cryptographic key revocation event.

8. The system of claim 1, wherein the cryptographic key servers are revocation servers.

9. The system of claim 1, wherein the computer-executable instructions further include instructions which, if executed by the one or more processors, cause the system to query one or more of the plurality of cryptographic key servers to validate the cryptographic key event.

10. The system of claim 1, wherein the graph representation is a k-connected directed acyclic graph which satisfies minimum connectivity requirements for the network.

11. A computer-implemented method, comprising:
responding to a cryptographic key event by at least:
traversing a graph representation of a plurality of cryptographic key servers to identify a cryptographic key server of the plurality of cryptographic key servers upon which to perform operations associated with the cryptographic key event; and
performing the operations on the cryptographic key server.

12. The computer-implemented method of claim 11, wherein the one or more operations associated with a cryptographic key event include operations that create one or more metadata records for a cryptographic key associated with the cryptographic key event.

13. The computer-implemented method of claim 11, wherein the cryptographic key event is a cryptographic key revocation event.

14. The computer-implemented method of claim 11, wherein the cryptographic key event is a temporary revocation of a cryptographic key, and wherein the operations at least include inserting a tombstone record onto one or more of the plurality of cryptographic key servers, where the tombstone record indicates that the revocation is temporary.

15. The computer-implemented method of claim 11, wherein the cryptographic key event is a restoration of a cryptographic key after a temporary revocation of a cryptographic key, and wherein the operations at least include using data stored in a tombstone record to restore the cryptographic key.

16. A non-transitory computer-readable storage medium having collectively stored thereon executable instructions that, as a result of execution by one or more processors of a computer system, cause the computer system to at least:
respond to a cryptographic key event by traversing a graph representation of a plurality of cryptographic key servers to identify a cryptographic key server upon which to perform operations associated with the cryptographic key event; and
perform the operations on the cryptographic key server.

17. The non-transitory computer-readable storage medium of claim 16, wherein the operations include at least one of: deleting a cryptographic key from a cryptographic key server of the plurality of cryptographic key servers, inserting a cryptographic key onto a cryptographic key server of the plurality of cryptographic key servers, and inserting a tombstone record onto a cryptographic key server of the plurality of cryptographic key servers.

18. The non-transitory computer-readable storage medium of claim 16, wherein the operations at least include inserting a tombstone record onto one or more of the plurality of cryptographic key servers, the tombstone record at least including a timestamp of a cryptographic key revocation event, a reason for the cryptographic key revocation event, and an identity of a revoking party.

19. The non-transitory computer-readable storage medium of claim 16, wherein the graph representation is a directed acyclic graph.

20. The non-transitory computer-readable storage medium of claim 16, wherein:
the graph representation includes a plurality of vertices and a plurality of edges configured in accordance with one or more connectivity constraints on the plurality of cryptographic key servers;
each vertex of the plurality of vertices represents a corresponding cryptographic key server; and
each edge of the plurality of edges connecting a pair of vertices of the plurality of vertices represents a network connection between a pair of corresponding cryptographic key servers of the plurality of cryptographic key servers.

* * * * *